(12) United States Patent
Thery

(10) Patent No.: US 8,881,449 B2
(45) Date of Patent: Nov. 11, 2014

(54) BAY-TYPE GREENHOUSE WITH OPTIMAL PERFORMANCE

(75) Inventor: Arnauld Thery, Eguilles (FR)

(73) Assignee: Filclair, Venelles (FR)

( * ) Notice: Subject to any disclaimer, the term of this patent is extended or adjusted under 35 U.S.C. 154(b) by 46 days.

(21) Appl. No.: 13/879,216

(22) PCT Filed: Oct. 6, 2011

(86) PCT No.: PCT/FR2011/052338
§ 371 (c)(1),
(2), (4) Date: May 31, 2013

(87) PCT Pub. No.: WO2012/049406
PCT Pub. Date: Apr. 19, 2012

(65) Prior Publication Data
US 2013/0239488 A1    Sep. 19, 2013

(30) Foreign Application Priority Data

Oct. 14, 2010    (FR) ...................................... 10 58372

(51) Int. Cl.
*A01G 9/00* (2006.01)
*A01G 9/14* (2006.01)
*A01G 9/24* (2006.01)

(52) U.S. Cl.
CPC . *A01G 9/14* (2013.01); *A01G 9/242* (2013.01)
USPC ............... 47/17; 47/29.5; 52/302.1; 454/250; 454/364

(58) Field of Classification Search
USPC ............... 52/199, 66, 69, 302.1; 47/17, 29.5; 119/436; 454/250, 365, 364, 339, 358
See application file for complete search history.

(56) References Cited

U.S. PATENT DOCUMENTS

| 673,497 | A | * | 5/1901 | Anton | ............................... 52/13 |
| 1,410,625 | A | * | 3/1922 | Sylvan | ............................ 49/94 |
| 4,672,889 | A | * | 6/1987 | Lynch | ............................ 454/364 |

(Continued)

FOREIGN PATENT DOCUMENTS

| EP | 355883 A1 * | 2/1990 | ............... A01G 9/24 |
| EP | 2189056 A2 | 5/2010 | |

(Continued)

OTHER PUBLICATIONS

International Search Report for PCT/FR2011/052338.

*Primary Examiner* — Joshua J Michener
*Assistant Examiner* — Babajide Demuren
(74) *Attorney, Agent, or Firm* — Caesar, Rivise, Bernstein, Cohen & Pokotilow, Ltd.

(57) ABSTRACT

A span type greenhouse has structural units installed parallel to one another over an entire length of a bay defined under a span. The ratio of a distance between a top of the greenhouse and a horizontal straight line passing through top ends of side posts over the bay width is less than 1/5. This greenhouse also has central double opening windows. In a transverse profile of the greenhouse, and angle formed between a straight line tangential to an arch segment in a transverse plane of the greenhouse at a side lintel, and a straight line intersecting a hinge axis and the end of a closed side window in the transverse plane of the greenhouse is non-zero in the direction of a concave side of the greenhouse profile, this break in slope procuring a slope for the closed window that is at least 15°.

11 Claims, 4 Drawing Sheets

(56) References Cited

U.S. PATENT DOCUMENTS

| | | | | |
|---|---|---|---|---|
| 4,837,990 | A | * | 6/1989 | Peleg .................................. 52/63 |
| 5,655,335 | A | * | 8/1997 | Vermeer ............................ 52/66 |
| 7,074,124 | B2 | * | 7/2006 | Williams ...................... 454/358 |
| 2009/0183425 | A1 | | 7/2009 | Zimhoni et al. |

FOREIGN PATENT DOCUMENTS

| | | | | |
|---|---|---|---|---|
| FR | 2700234 | A1 * | 7/1994 | ............... A01G 9/14 |
| GB | 390156 | A | 3/1933 | |
| GB | 2120065 | A * | 11/1983 | ............... A01G 9/24 |

* cited by examiner

BAY-TYPE GREENHOUSE WITH OPTIMAL PERFORMANCE

BACKGROUND OF THE INVENTION

The present invention relates to the general field of greenhouses of the "span" type that are designed to be installed in multi-span runs each covering several thousand square meters or indeed several hectares uninterrupted.

Each "span" greenhouse is constituted by a plurality of structural units installed parallel to one another over the entire length of the bay.

Each structural unit comprises at least two side vertical posts, separated by a predetermined bay width, and supporting roof-forming arch segments.

In conventional manner, the structural units are connected together at the top ends of the posts via longitudinal gutters.

The invention relates to greenhouses having a roof covering made up of a transparent wall formed by a tensioned film of plastics material of the single wall type or of the inflatable double wall type. Since the use of plastics films as roof coverings for greenhouses has become widespread, the bay widths of the greenhouses manufactured across the world have increased unceasingly.

In parallel with the development of the use of greenhouses with single-walled and then inflatable double-walled plastics roofs, across the world, bay widths have increased, and multi-bay installations have supplanted single-bay installations. Single-bay installations are installations made up of a single span whereas multi-bay installations are made up of more than one span.

Widening the bay width of the greenhouses, and developing the multi-span concept procures a reduction in the raw materials used and thus a reduction in investments. Such installations make it possible to obtain a good return on investment.

The invention is situated in the context of such change. The invention relates more particularly to greenhouses of the "multi-span" type in which the bay width is greater than 9 meters (m) and that are installed in multi-bay installations.

It is recognized by the profession that the optimum profile for the vault of a greenhouse must maximize the extent to which it tracks the angles of incidence of the sun in order to maximize the amount of sunlight it receives. The plastics film must then, as far as possible, be situated at 90° relative to the angle of incidence. An angle not equal to 90° increases the thickness of the plastics layer through which the ray of sunlight passes and reduces the power thereof. This rule has led to almost generalized use of a greenhouse profile having a ridge height over bay width ratio that is always greater than 1 to 5, and, above all, having a pointed arch shape. Such a profile is very effective in preserving optimum angle of incidence with the sun's rays, and thus in limiting the problems of refraction at small angles of incidence.

However, a multi-bay installation implies the presence of shadows cast by each greenhouse vault on the vault of the next greenhouse. This does not take place in single-bay span greenhouses. It can thus be observed that wide zones of shade are cast at the start of the day and at the end of the day, giving rise to delayed arrival of the sunlight and to a premature drop in the sunlight available for photosynthesis in most multi-span greenhouses.

In addition, the more the bay width increases, the longer the time for which a given strip of the greenhouse remains in the shade.

And yet it is increasingly crucial to improve productivity in greenhouses, where such productivity depends mainly on the incoming quantity of sunlight responsible for photosynthesis, at all points of the greenhouse.

The presence of cast shadows has become increasingly counterproductive as spans have widened, because of the sizes of the shadows cast and because of the sizes of the resulting masses of cold air.

Since the results obtained remain satisfactory, the generally high pointed-arch shape is little contested by the profession. The recent arrival on the market of greenhouses having bay widths greater than 12 m has, however, rekindled questions about the presence of the cast shadows.

Another very important point in the operation of greenhouses of bay width greater than 9 m is the effectiveness of their ventilation. It is currently recognized that the presence of double opening windows along the ridge of the greenhouse is an optimum solution, particular in regions with little wind.

The presence of such central double opening windows along the ridges of greenhouses of large bay width is particularly advantageous because such windows make it possible to stimulate the effects of air convection, in particular at the start of the day when the problems of non-uniformity of temperatures due to the presence of cast shadows are particularly significant. Locating such double opening windows at the tops of the spans is crucial in order to generate movements of air throughout the space inside the greenhouse, above all in the absence of wind.

The air convection movements are thus triggered by a chimney effect. The taller the greenhouse, the more effective the chimney effect is. The invention thus concerns greenhouses for which the vertical posts are of height greater than 3.5 m.

In windy regions, other locations for opening windows make it possible to blow enough air through to cause the air at the tops of the bays to flow. Such a greenhouse is known that has an opening window along the gutter and that has a ridge height to bay width that is very small and less than 0.15.

This profile has been criticized because it was then observed that, whenever the ratio of the distance between the top of the greenhouse and the straight line passing through the top ends of the side posts over the bay width is less than 1 to 5, the presence of condensation becomes prejudicial substantially over the central third of the vault.

With such a dimension ratio, condensation cannot be removed by gravity along the walls of the vault. In the absence of wind, the air present at the top of the greenhouse cannot be removed, condensation is thus persistent and generates a problem of dripping. Such phenomena are observed particularly at the start of the day when the start of the photosynthesis cycle generates evapotranspiration of the plant matter that is five times higher than during the night, and a sudden increase in humidity. These phenomena are a recognized problem of vaults of low characteristic dimensional ratio.

For a characteristic dimensional ratio less than 0.20, the angle from which the ridge is seen from the top end of the post is less than 21.8°. It is also necessary for the arch segments forming the roofs of greenhouses covered with plastics walls to have a minimum curvature taking their path away from the straight line connecting the ridge of the greenhouse to the top end of the post. This minimum curvature of the roof-forming arch segments, even with the use of an arcuate segment or "arc" that is of broken curvature or that is pointed arch shaped, makes it possible to access a maximum angle at the top of the greenhouse that is less than 15° for bay widths exceeding 9 m. That angle does not allow drops to run off along the walls. Condensation phenomena are thus very problematic in greenhouses having large bay widths, side opening windows, and a characteristic dimensional ratio less than 1 to 5.

It is then necessary to wait either for action from wind to dry the atmosphere or for the inside of the greenhouse to heat sufficiently to see the condensation problem disappear.

Installing an opening window on the ridge in order to allow central aeration is precluded because the phenomenon of condensation on the low-gradient central portion would still not be prevented, in particular at the start of the photosynthesis cycle, and the opening movements would give rise to even more significant dripping.

Opening the central opening window at the start of the day would also be disastrous because the movements to open the opening window on which the condensation at the top of the greenhouse has built up would systematically give rise to dripping. Such dripping can take place starting from a low point of the pouch formed by the bottom wall of the inflatable double wall or can take place starting from any point of said bottom wall.

The invention proposes to solve this particular problem of condensation for greenhouses having flattened-arch profiles. The invention also proposes to sweep aside a preconception about the ineffectiveness in terms of performance of greenhouses having flattened-arch profiles.

OBJECT AND SUMMARY OF THE INVENTION

To this end, the present invention provides a "span" type greenhouse designed to be installed in "multi-span" runs each covering several thousand square meters uninterrupted, this "span" type greenhouse being constituted by a plurality of structural units installed parallel to one another over the entire length of the bay;

each structural unit being made up of at least two side vertical posts having a height greater than or equal to 3.5 m, separated by a bay width strictly greater than 9 m and supporting roof-forming arch segments at their top ends, which arch segments meet at the center of the greenhouse, the structural units being connected together at the top ends of the posts via longitudinal gutters;

the surfaces of the greenhouse being designed to receive a transparent roof covering made up of one or more plastic films.

said greenhouse being characterized in that, with said greenhouse being such that the ratio of the distance between the top of the greenhouse and the horizontal straight line passing through the top ends of the side posts over the bay width is less than $1/5$;

said greenhouse has central double opening windows hinged along at least one hinge axis at the top of the of greenhouse, these double opening windows being such that each of the side opening windows has a width between the hinge axis and the end of the opening window equal to 1.4 m, the end of the opening window coming to rest on side lintels on closure;

the transverse profile of the greenhouse with its opening windows closed being such that, on either side of the greenhouse, the angle formed between the straight line that is tangential to the arch segment in the transverse plane of the greenhouse at the side lintel and the straight line intersecting the hinge axis and the end of the closed side opening window in the transverse plane of the greenhouse is non-zero in the direction of the concave side of the profile of the greenhouse, this break in slope procuring a slope for the closed opening window that is greater than or equal to 15°.

Below, the ratio of the distance between the top of the greenhouse and the horizontal straight line passing through the top ends of the side posts over the bay width is referred to as the "characteristic dimensional ratio of the greenhouse" which, in this example and in accordance with the invention, is less than $1/5$.

The characteristics of the greenhouse of the invention make it possible to solve the problem of condensation in the central third of the flattened span by installing central double opening windows therein, and by providing a break in slope at the ends of the side opening windows between the wail of the greenhouse and the wall of the opening window.

The fact that the central third of the flattened span is, in accordance with the invention, constituted by double opening windows makes it possible to procure ventilation effects that are optimum because they are central. The height of the side posts that is greater than 3.5 m and the presence of the double opening windows procure a very effective chimney effect. When it is desired to increase the chimney effect further, while also preserving low characteristic dimensional ratio, the height of the side posts is increased. Typically posts of height greater than 5 m may be used. The combination of said post height with the flattening of the vault of the greenhouse makes it possible to reduce the quantity of material used for a chimney effect identical to the chimney effect procured with a lower post height and a higher vault. It can be observed that the ratio of the height of the vault over the height of the posts is very different from the currently known ratios and very much less than them by means of the very small height of the vault. By mounting the vault on high side posts, the chimney effect is not adversely affected because a large height under the central double opening windows is preserved.

The arrangement, in accordance with the invention, of a break in slope between the tangent to the arch segments and the slope of the opening window makes it possible to preserve a ratio of the distance between the top of the greenhouse and the straight line passing through the top ends of side posts over the bay width less than $1/5$, while also procuring a slope for the opening windows greater than 15° and compatible with removing the night's condensation from the greenhouse.

Such a flattened-arch greenhouse profile having a break in slope constitutes the major originality of the invention in the particular context of current greenhouses of large dimensions. This particular profile makes it possible to solve the problem of condensation observed systematically in the central third whenever a flattened profile is used in current greenhouses of large dimensions.

The combination of the break in slope with the flattened-arch nature of the greenhouse makes it possible to procure a combined effect of these two characteristics in order to remove the problem of condensation inside the greenhouse over the central third of the vaults.

This effect of removing the morning condensation is obtained, firstly, by means of the locally increased slope at the center of the span and that makes it possible for the droplets of condensation to run off, and by means of the reduction in the cast shadows that leads to quick heating of the atmosphere in the greenhouse at the start of the day, generating very good evaporation of the condensation droplets.

Overall, it can be observed that it is preferable to distribute the sunlight input throughout the day. In particular, currently it is being sought to use the sunlight from the morning and evening hours when the sun has a low angle of incidence to increase productivities. In many cases, operators light the greenhouse artificially during such hours. The reduction in the cast shadows that is offered by the substantially flattened profile makes it possible to make best use of the morning and evening sunlight. The advantage of a greenhouse model that, by its simple flattened geometrical shape, gives to its user efficiency of 10% additional free sunlight every day is evident.

An additional synergic effect comes from the fact that, in the morning and evening hours, the angle of solar incidence is larger on the opening windows than on the plane tangential to the roof-forming arch segments at the end of the opening window, by means of the break in slope of the invention.

The lowness of the angle of solar incidence over the central third of the top of a greenhouse having a characteristic dimensional ratio less than 0.20 without a break in slope is prejudicial. The flatness of the top of the greenhouse having a characteristic dimensional ratio less than 0.20 generates a phenomenon of shade by refraction of the rays inside the greenhouse before the angle of incidence becomes sufficient to cause the sunlight to enter properly into the central third.

At the start and at the end of the day, in the absence of a break in slope, the almost flat central third generates a dark spot inside the greenhouse, mainly because of the angle of incidence of the sun that cannot penetrate into the greenhouse at this level because of refraction phenomena. It can be observed that this unfavorable angle of incidence of the sun at the start of the morning delays removal of the droplets formed by condensation.

The condensation formed over the central third cannot therefore be dislodged by direct solar irradiation before much later in the day.

Conversely, the top surfaces of the flattened-arch greenhouses make it possible for the light to penetrate mainly at the hottest hours of the day, which is also generally prejudicial because it generates the greatest amount of heating at the least desirable time.

These phenomena of angle of solar incidence on the central third of a greenhouse having a low characteristic dimensional ratio can even cancel out the positive effects of the reduction in the shadows cast on the successive greenhouses that is made possible by such a low characteristic dimensional ratio. In addition, since, with the invention, the angle of solar incidence on the central third of the greenhouse is less favorable to penetration of the rays around midday than with a simple flattened-arch greenhouse without a break in the slope, overheating is avoided during the hottest hours of the day. If need be, the use of a diffusing film on the opening windows can make it possible to reduce still further the overheating during the hours when the sun is at its zenith.

The use of a break in slope with the curved profile of the roof-forming arch segments makes it possible to procure, in parallel, in the central third at the centre of the greenhouse, an angle of solar incidence at the start of the morning that is more favorable in order to remove, by heating by the sun, the droplets of condensation from the inside walls in the central third. The angle of solar incidence on the opening windows is thus synergic with the effects described above in order to further reinforce the removal of the condensation.

The presence of a break in slope, combined with a characteristic dimensional ratio less than $\frac{1}{5}$ thus makes it possible to solve a problem of condensation hitherto unknown because never hitherto encountered. Implementing the break in slope with opening windows makes it possible in addition to install double opening windows along a ridge for flattened-arch greenhouses, it being possible for such double opening windows to be opened in the event it rains.

The presence of the break in slope increases the capacity of opening and thus improves the possibilities of managing the humidity and the temperature in the greenhouse in the event it rains. The double break in slope on either side of the top of the greenhouse makes it possible to comply with an opening angle of the opening windows that is greater than 1%, making it possible for the rainwater to run off, while also preserving sufficient ventilation capacity. This point is particularly crucial in tropical zones characterized by a significant rainy season, and by an absolute necessity to preserve a significant ventilation potential despite the rain falling outside.

Another technical effect of the invention's combination of a flattened-arch profile and of a break in slope is that the Venturi effect is accelerated by reducing turbulence in the air flowing at the tops of the greenhouses whenever one of the opening windows is open. The invention then serves to facilitate ventilation for low winds.

Double opening windows along the ridge substantially work in two main configurations.

1. Wind lower than 3.5 meters per second: managing the humidity and temperature levels is dependent on the draft force constituted by the difference in temperature between the ground inside the greenhouse and the outside air and by the height of the resulting chimney. The invention makes it possible to increase the height of the chimney on a flat-shaped vault by means of the double break in slope.

2. Wind higher than 3.5 meters per second: The ventilation power and thus the capacity to manage humidity and temperature levels inside the greenhouse depend on the capacity, measured by fluid mechanics software, to put air in motion by Venturi effect at the ends of the opening windows, An aircraft wing profile having two slopes makes it possible to increase characteristically the power of the device by reducing the turbulence generated.

Already, it is known that a small characteristic dimensional ratio makes it possible for a more laminar flow than with higher characteristic dimensional ratios currently used in greenhouses having central opening windows. When greenhouses have a flattened-arch profile, the air undergoes fewer rebounds off the successive vaults of the greenhouses and less turbulence is generated over the run of greenhouses.

The presence of the break in slope is particularly advantageous whenever one of the opening windows is opened in such a manner as to form an angle with the closed opening window. This makes it possible for air to accelerate firstly over the break in slope of the closed opening window, and then over the outside wall of the open opening window that, by forming an even larger angle with the horizontal, enables the air to accelerate yet further. The air thus arrives at the end of the open opening window with increased speed, with as little turbulence as possible, i.e. in the form of a flow that is as laminar as possible.

This results in optimum suction at the end of the opening window. This suction is responsible for a reinforced Venturi effect that sucks air from under the open opening window. This generates a flow of air through the greenhouse that is significantly improved compared to known situations in which the turbulence generates a reduction in the effect of the flow of wind that has optimum effectiveness whenever its flow is laminar.

The possibility of achieving such optimized ventilation makes it possible, when it is possible to open the opening window early in the day, to participate in removing the condensation at the start of the day.

The greenhouse profile of the invention also has an aesthetically pleasing appearance when the opening windows are open. From a distance the opening windows look like they are "hovering" above vaults of the greenhouses that are otherwise very flat. This gives a very pleasing impression of lightweightness. In greenhouse location zones that are particularly sensitive as regards aesthetic appearance, this point can decisive.

Finally, one of the additional effects of the break in slope is the possibility of opening the opening windows in such a manner that they track the angle of incidence of the sun. This enables the sun's rays to pass under the opening windows between them and the side lintels, this open strip being of relatively wide width by means of the break in slope.

It can then be observed that the shadow cast on the next vault is further reduced by this practice Finally, the cast shadow reduction that is obtained with a profile of the invention and a characteristic dimensional ratio less than 1 to 5 avoids having to light the greenhouse artificially and increases the range of time for which sunlight necessary for photosynthesis is present in the morning and in the evening. The loss of power by increasing the angle of incidence of the sun on the film actually has less impact on the overall duration of sunshine than the loss of sunlight generated by the formation of cast shadows in multi-bay greenhouses.

In accordance with a preferred characteristic of the invention, the ratio of the distance between the top of the greenhouse and the horizontal straight line passing through the top ends of the side posts over the bay width is less than 0.182.

With such a value for the characteristic dimensional ratio of the greenhouse, the effect of the invention is optimum according to the observations of the inventors, insofar as, for such a value, the maximum angle from which the top of the greenhouse is seen from the top ends of the side posts is less than 20°.

In such a case, the cast shadow reduction is optimized while also ensuring that there is no problem of condensation on the opening windows by means of the break in slope.

Obtaining such a characteristic dimensional ratio could lead to a revolution in the field of plastic greenhouses by flattening the greenhouse roof arch to an increasingly marked extent while not encountering condensation problems, including at the tops of the spans. Since such flattening makes it possible to gain hours of sunshine, significant productivity gains are to be expected from greenhouses of the invention.

In an advantageous embodiment, the break in slope is provided via an elevation support fastened to the top of the roof-forming arch segments and at the top of which the hinge axis or hinge axes of the side opening windows is/are placed.

Such an embodiment makes it possible to avoid having to bend the tubes forming the roof-forming arch segments in order to achieve the break in slope.

The break in slope is made only by causing the hinge axis or the hinge axes of the side opening windows to be carried by an elevation support fastened at the point of junction between the roof-forming arch segments at the center of the greenhouse. The roof-forming arch segments then form a first vault above which the double opening windows form a triangular cover having slopes greater than or equal to 15°.

The use of such an elevation support is known on greenhouses of higher characteristic dimensional ratio. Such a support then serves to improve ventilation and the runoff of rainwater. Using it to form a break in slope on a flattened-arch greenhouse makes it possible to solve the problem of condensation in the central third, that problem being encountered only in this type of greenhouse.

Using the elevation support also avoids manufacturing roof-forming arch segments that are specific to the break in slope of the invention. In addition, this reduces the quantity of material necessary for forming the roof-forming arch segments insofar as the length of arc that is necessary decreases with increasing ridge height of the arch segments.

With this characteristic, the ridge height of the roof-forming arch segments is reduced to a ridge height over bay width ratio that is very small.

In a preferred embodiment of the invention, the ratio of the distance between the point of junction at which the arch segments meet and the horizontal straight line passing through the top ends of the posts over the bay width is less than 0.17.

This characteristic according to which the ridge height over bay width ratio of the arch segments is less than 0.17 also makes it possible to place the side lintels very low relative to the tops of the side posts and to allow optimum ventilation and optimum lighting of the greenhouse to be achieved.

In accordance with a preferred characteristic of the invention, the ratio of the distance between the point of junction at which the arch segments meet and the horizontal straight line passing through the top ends of the posts over the bay width is less than 0.15.

This characteristic procures a very flat overall shape for the greenhouse, which is very advantageous as regards sunlight and as regards the quantity of materials used. However, with an elevation support making it possible for the opening windows to have a slope of 15°, this makes it possible to procure a break in slope solving the condensation problems that are specific to such a flattened-arch greenhouse. In addition, even with the elevation implied by the presence of the opening windows, such a greenhouse continues to have a characteristic dimensional ratio that is very advantageous because it is very flat. The elevation necessary for procuring a slope of 15° for the double opening windows over the central third of the flattened greenhouse allows a low characteristic dimensional ratio less than 0.20 to be achieved. The cast shadows are then reduced.

In embodiments of the invention, the roof-forming arch segments are arcuate segments or "arcs", the curvature of which may be broken or unbroken.

This characteristic makes it possible to use a variety of arch segments that can be curved continuously or in broken manner to form pointed arch shapes. In any event, the elevation support is fastened at the join between the side arch segments.

In a particular embodiment, the elevation support is made of a metal sheet folded into a trapezoid shape.

This characteristic is an inexpensive manner of forming the elevation support. It also makes it possible to obtain a flange-plate at the top of the elevation support and thus at the top of the greenhouse. This flange-plate makes it possible to fasten specific fastening elements making it possible to hinge the opening windows on either side and, at the same time, to comply with the dimensional problems encountered in greenhouses of this size.

The presence of this flange-plate at the top of the greenhouse is also advantageous for any installation of plastic films and of any guttering chutes for collecting rainwater, etc.

This shape also procures very good mechanical strength in order to withstand the particular stresses exerted on this support by the opening windows, in particular when they receive wind.

Other embodiments of an elevation support are known from the prior art but this particular shape brings a higher level of tear strength. It is very easy to mount on the roof-forming arch segments and makes it very easy to install opening windows on the top of the greenhouse.

Advantageously, the greenhouse includes an automatic management module for automatically managing the opening windows, which module is suitable for controlling operation of the opening windows and is programmed to control opening of the opening windows as a function of the angle of solar incidence.

This characteristic makes it possible to make a further gain in duration of sunshine by procuring, in particular, a reduction in the cast shadows because the sun's rays can pass between the opening windows and the side lintels of the greenhouse when the opening windows are placed in mutual alignment and when, together, they track the angle of solar incidence.

The angle of solar incidence may be pre-programmed in the module, typically stored in a memory, as a function of the calendar day and of the time at the place where the greenhouse is installed.

The management module may be connected to a sensor for sensing the angle of solar incidence, the management module for managing the opening windows then receiving data giving measured angle of solar incidence and being programmed to control the opening of the opening windows as a function of said measured angle.

BRIEF DESCRIPTION OF THE DRAWINGS

Other characteristics and advantages of the present invention appear from the following description given with reference to the drawings that show an embodiment of the present invention that is in no way limiting. In the figures.

DETAILED DESCRIPTION OF THE INVENTION

In the field of horticultural and agricultural greenhouses, it is currently acknowledged that the slightest additional percentage of sunlight procures a considerable advantage for yield.

The "driving force" of the greenhouse system is photosynthesis, which is directly related to the quantity of sunlight received by the plants.

Presently, optimization of sunlight is determined mainly by adjusting the angle of incidence of the sun relative to the roofing walls of the greenhouse.

Figure 1:
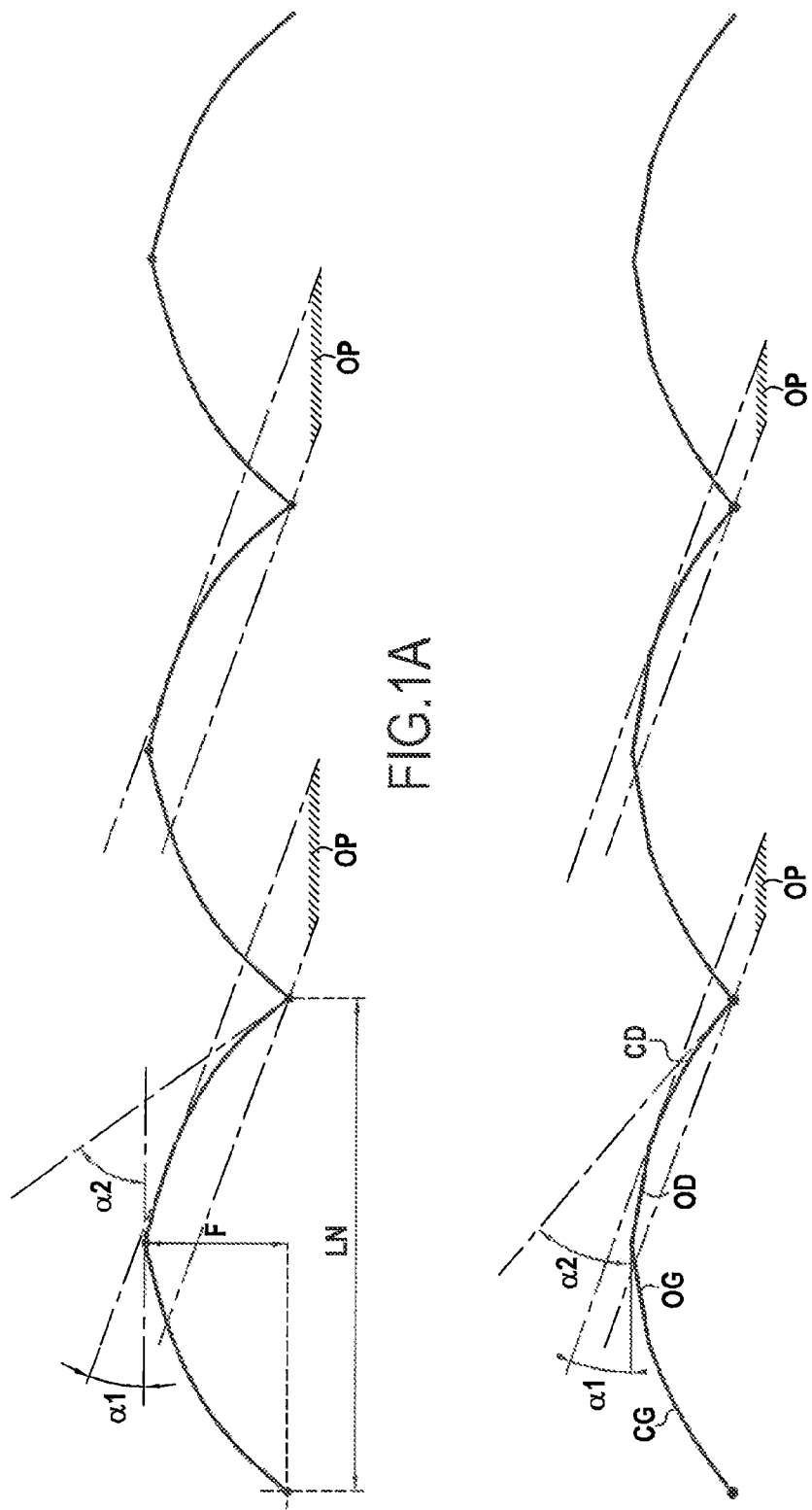
FIGS. 1A and 1B show the problem of zones of shade cast in multi-span greenhouse installations.

Such an adjustment leads to greenhouses of the pointed-arch type as shown in FIG. 1A.

In this figure, the ratio of ridge height F over bay width LN is equal to 0.286, and the angle at which the ridge is seen from the gutter point, referenced C, is 29.7°.

FIG. 1A shows a plurality of rays of angles of incidence $\alpha 1=20°$. It can be seen that there exist cast shadows OP that are cast on the successive vaults and inside the greenhouses for any angle of solar incidence less than $\alpha 2=54°$. Such cast shadows generate non-uniformity in the temperature inside the greenhouse in the early morning.

Such temperature non-uniformities generate different stresses on the crops and growth differentials among the crops grown in the greenhouse. This applies particularly since the shadows cast cause certain zones of the greenhouse to be entirely deprived of sunlight at the start of the day. Such zones lose sunshine hours, resulting in disparities in growth. It can thus be noted that the problem of cast shadows is particularly detrimental when the greenhouses are of large bay width, and typically of bay width greater than 9 m, because the dimensions of the cast shadows are then considerable. It can thus be seen, in FIG. 1A, that with a characteristic dimensional ratio, which, in this example, is the ratio of the ridge height over the bay width of the pointed arch segments, of about 0.286, and with an angle of solar incidence of 20°, about one-third of the greenhouse is subjected to cast shadows OP.

Overall, with the greenhouse of FIG. 1A, the cast shadows OP disappear only for angles of incidence of the sun that are greater than 50°, which is a large angle of incidence. This results in loss of a large quantity of hours of morning sunshine.

In order to reduce the effect of the cast shadows, it is known that films can be used for diffusing the sunlight, the use of such films making it possible to improve slightly the distribution of the sunlight inside the greenhouse, but not solving the problem of temperature non-uniformity and of stress to which the crops are subjected locally.

FIG. 1B shows a greenhouse having a maximum characteristic dimensional ratio of the invention, i.e. ridge height over bay width F/LN=0.20. This greenhouse is shown with arcuate segments CG and CD forming a pointed arch of profile that is conventional in this field.

It should be noted that it is necessary for the arcuate segments CD and CG forming the roof to be curved in order to obtain proper tensions for the plastic films constituting the roofing walls and in order to limit the phenomena of condensation on the non-opening portions of the greenhouse. The greenhouse of FIG. 1B is provided with opening windows OG and OD along the ridge. Each opening window conventionally has a width of about one-third of the bay half-width. This results in the slope of the opening windows being about 10°.

Such a slope is not suitable for procuring proper runoff of the droplets of condensation that build up on the inside wall of the central third during the night. The problem of condensation is encountered with a slope of 10° regardless of whether single-walls or inflatable double-walls are used.

Even with a single wall, the sag of the plastics films used to date does not make it possible for condensation to be removed with an opening window angle of 10° from a low point. Naturally, this also applies with an inflatable double wall, even in the presence of differential film tension.

This is even more critical in flat-arch greenhouses of large widths because, as described above, it is known that the central third of the greenhouse gathers most of the condensed water.

In addition, insofar as, in the absence of opening windows along the gutters, the only possibility of ventilating the greenhouse is to open the central double opening windows, there is no solution for removing the condensation properly by means of the ventilation because opening the double opening windows would give rise to dripping into the greenhouse.

Furthermore, it is observed that, when it rains, an opening angle of 10° is insufficient to provide sufficient ventilation and proper runoff of the rainwater. In order to enable proper runoff to take place, it is necessary to preserve a slope of about 2° for the opening windows, which would involve opening the opening window through 8° only, which is too small an angle to enable proper ventilation to take place.

It can thus be noted that, for all flat-arch greenhouses of characteristic dimensional ratio less than 0.20, it has, until the invention, been precluded or at least detrimental for double opening windows to be placed along the ridge.

However, it can be noted that, in FIG. 1B, an angle of solar radiation of $\alpha 1=20°$ generates the presence of a cast shadow OP that is very small and indeed negligible. Furthermore, the cast shadows disappear for an angle $\alpha 2=40°$, thereby considerably widening the range of duration of sunshine on the greenhouse. It can thus be understood how advantageous greenhouses with flattened-arch profiles are, even though the angle of solar incidence is less favorable as regards refraction.

Figure 2:
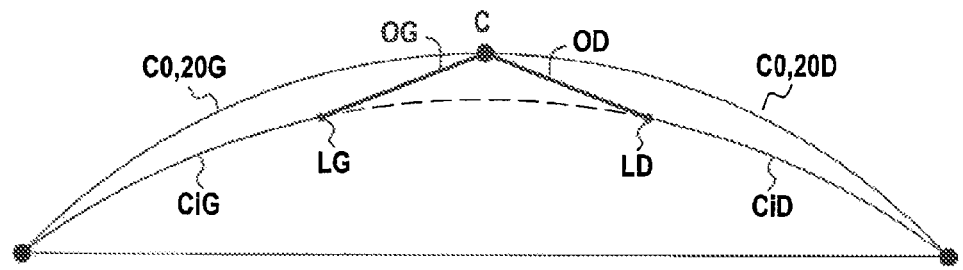
FIG. 2 shows the profile of a greenhouse having the maximum dimensional ratio of the invention, with central double opening windows, and also shows, superposed, the profile of a greenhouse of the invention.

The solution of the invention is shown in FIG. 2. The idea is to shape the profile of the greenhouse in such a manner that it has a break in the slope in the direction of the concave side of the flattened-arch profile of the greenhouse.

FIG. 2 shows two profiles. The first profile is based on the use of an arcuate segment C0.20 having a ridge height over bay width ratio equal to 0.20, on which segment it is not possible to place double opening windows along the functional ridge while also preserving curvature of the side arch segments C0, 20D and C0, 20G that is sufficient for placing a plastic film over the vault.

The second profile, which is a profile of the invention, is such that the central double opening windows made up of two side opening windows OG and OD have the same high point or crest C as the arcuate segments C0.20G and C0, 20D, procuring a characteristic dimensional ratio for the greenhouse that is equal to 0.20, but they extend downwards on either side of the central high point C, which is the top or apex of the greenhouse, while forming an angle greater than 15° with the horizontal, and equal to 21° in this example.

The ends of the opening windows come to rest on the side lintels LG and LD, placed on the arcuate segments CiG and CiD that extend to the gutters on either side of the greenhouse. It can be observed that the tangent to each of the arcuate segments CiG and CiD at the corresponding lintel LD or LG forms a non-zero angle with the slope of the opening window placed at an angle of 21°, which non-zero angle is greater than 15°, from the horizontal. Such a profile, broken on either side of the center of the greenhouse, makes it possible to solve the problem of condensation over the central third of the greenhouse.

It can be noted that, with the invention, positioning the opening window ajar so that it juts out awning-like, while it is raining, is entirely functional because it is possible to open the opening window at an angle greater than 10° while also ensuring that the rainwater runs off properly over the opening window.

The opening windows are advantageously of width between their hinge and their opening end of the order of about one-third of the half-width of the bay. The opening windows thus cover the entire portion that currently poses a problem as regards condensation in flat-arch greenhouses having opening windows along gutters in the absence of sufficient wind. In greenhouses of very large widths, e.g. larger than 12 meters, the portion represented by the opening windows may naturally be smaller than one-third of the width. However, it can be understood that, since the problem of condensation is increasingly critical on going closer to the centre of the greenhouse, the presence of double opening windows with a break in slope is still advantageous even if the double opening windows cover only a portion less than one-third of the width of the greenhouse. Thus, even though a portion of about one-third of the bay width is preferable, double opening windows representing one sixth of the bay width may be considered in the widest greenhouses.

The role of the opening window is to accentuate the slope on either side of the top of the greenhouse at the precise place where the condensation problem is located. This also solves the problem of ventilation of flat-arch greenhouses in regions with little wind. The invention makes it possible to install double opening windows along the ridge in the very particular case of flat-arch greenhouses.

One of the advantages of known flat-arch greenhouses is that their vault generates little turbulence in the flow of the wind above the multi-span greenhouse. The invention also relates to maintaining a flow that is as laminar as possible above the multi-span greenhouse.

Figure 3:
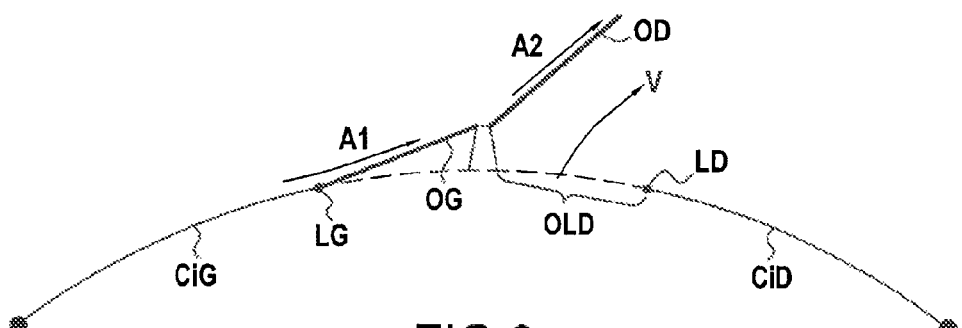
FIG. 3 shows the advantage of the invention as regards ventilation.

As shown in FIG. 3, the invention makes it possible for slope breaks to be provided in two stages. Firstly the wind undergoes a first acceleration A1 over the slope of the left opening window referenced OG and then a larger acceleration A2 over the outside wall of the open right opening window OD. This is due to the increasing angle relative to the horizontal. Such a progressive acceleration of the air flows generates a Venturi effect V that is at its maximum at the end of the opening window because the flows of air remain as laminar as possible, insofar as the geometry of the opening windows minimizes generation of counterproductive turbulence. The invention makes it possible to optimize the suction Venturi effect V by maintaining wind flow as laminar as possible. The break in slope combined with the flatness of arch of the greenhouse thus makes it possible to increase the ventilation by Venturi effect in the presence of wind.

Figure 4:
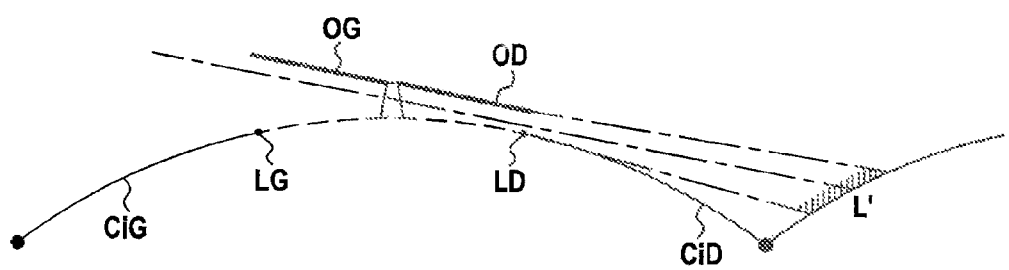
FIG. 4 shows a position for the opening windows that is particularly advantageous at the start of the day, and made possible by the invention.

FIG. 4 shows an additional advantage of the invention that is relatively subtle but that can be important for gaining a few percent of sunlight or a few minutes of sunshine.

It can be noted that, by adjusting the positions of the opening windows OG and OD in a manner adapted to the movement of the sun in the morning, it is possible to recover rays over a surface area L' of the successive vault in the path of the rays by allowing said rays to pass under the opening windows between the opening windows OG and OD and the lintels LD and LG on which the opening window ends come to rest when said opening windows are closed. It is thus possible to recover the sun's rays at angles of incidence less than 30° for a short period, at the start of the day, which is a critical moment, in particular as regards condensation, and, if necessary, at the end of the day.

In general, the opening windows are motor-driven so as to enable them to be opened and closed. Such motor-drive is conventionally managed by a management module, typically a computer, connected to a weather station. The weather station typically includes a humidity sensor, a temperature sensor for sensing the temperature inside the greenhouse, a rain sensor, and outside wind speed and wind direction sensors. Thus, opening and closing the opening windows is governed by interior and exterior constraints.

In accordance with the invention, such a management module is advantageously connected either to a date and time calendar, including the angles of solar incidence, at least for low angles of incidence below 30°. Such a management module can also be connected to a sensor for sensing angle of solar incidence. It is then capable of deciding to "align" the two opening windows and to change the angle of opening of the "mutually aligned" opening windows so as to form a plane that tilts as the angle of solar incidence progresses. It is thus possible to make a further gain in the quantity of sunlight in the greenhouse.

It should be noted that this characteristic of tracking the angle of solar incidence by the double opening windows being aligned to form a plane tracking the angle of solar incidence can be implemented independently from the specifically claimed greenhouse configuration in order to optimize input of sunlight. However, with the invention, which makes it possible to procure a flattened-arch profile already enabling the cast shadows to be reduced while also avoiding condensation problems, this characteristic is even more advantageous because it makes it possible to gain even more sunlight.

Figure 5:
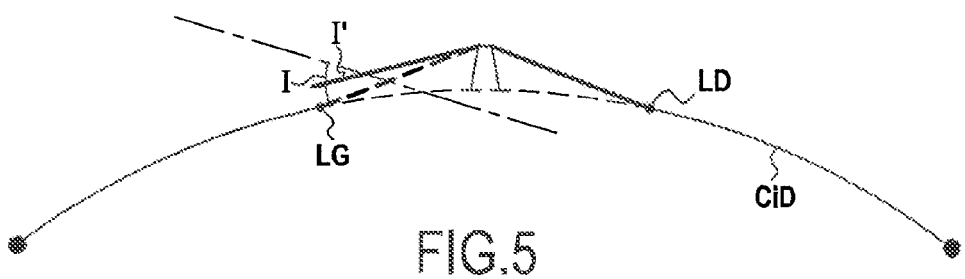
FIG. 5 shows the advantage of the invention as regards angle of solar incidence at the start of the day and as regards shade generated by the presence of double opening windows for an angle of solar incidence of 15°.

FIG. 5 shows the difference in angle of solar incidence on an opening window that forms an angle of 10° with the horizontal and on an opening window that forms an angle of 15° with the horizontal.

It can be observed that, for the sun's rays at the start of the day, e.g. as in this example for an angle of incidence equal to 15°, the angle of incidence I of the rays on the central third of the greenhouse is more favorable to penetration of the rays into the greenhouse when the opening window has a slope of 15°. This makes it possible to limit the refraction phenomena that are observed to a greater extent when the opening window has a shallower slope. The angle of incidence I' for an opening window placed at 10° as applies on a greenhouse having a characteristic dimensional ratio equal to 0.20 is smaller.

Thus, at the start of the day, the invention makes it possible to gain sunlight compared to an ordinary flattened-arch greenhouse in which a central opening window has a slope of about 10°. This improved angle of incidence of the sun's rays also makes it possible to heat the opening windows more rapidly, and this participates in removing any condensation that has occurred on the central third of the greenhouse.

Conversely, in the middle of the day, the angle of 15° that the opening windows make with the horizontal makes it possible to reduce the angle of incidence of the rays of the sun at its zenith compared to an opening window placed at 10° offering an angle of incidence with the sun that is more favorable to the penetration of the rays into the greenhouse. The angle of 15° of the opening windows of the invention makes it possible to reduce heating of the greenhouse in the middle of the day and to reduce the direct radiation from the sun at its zenith on the crops.

Figure 6A:
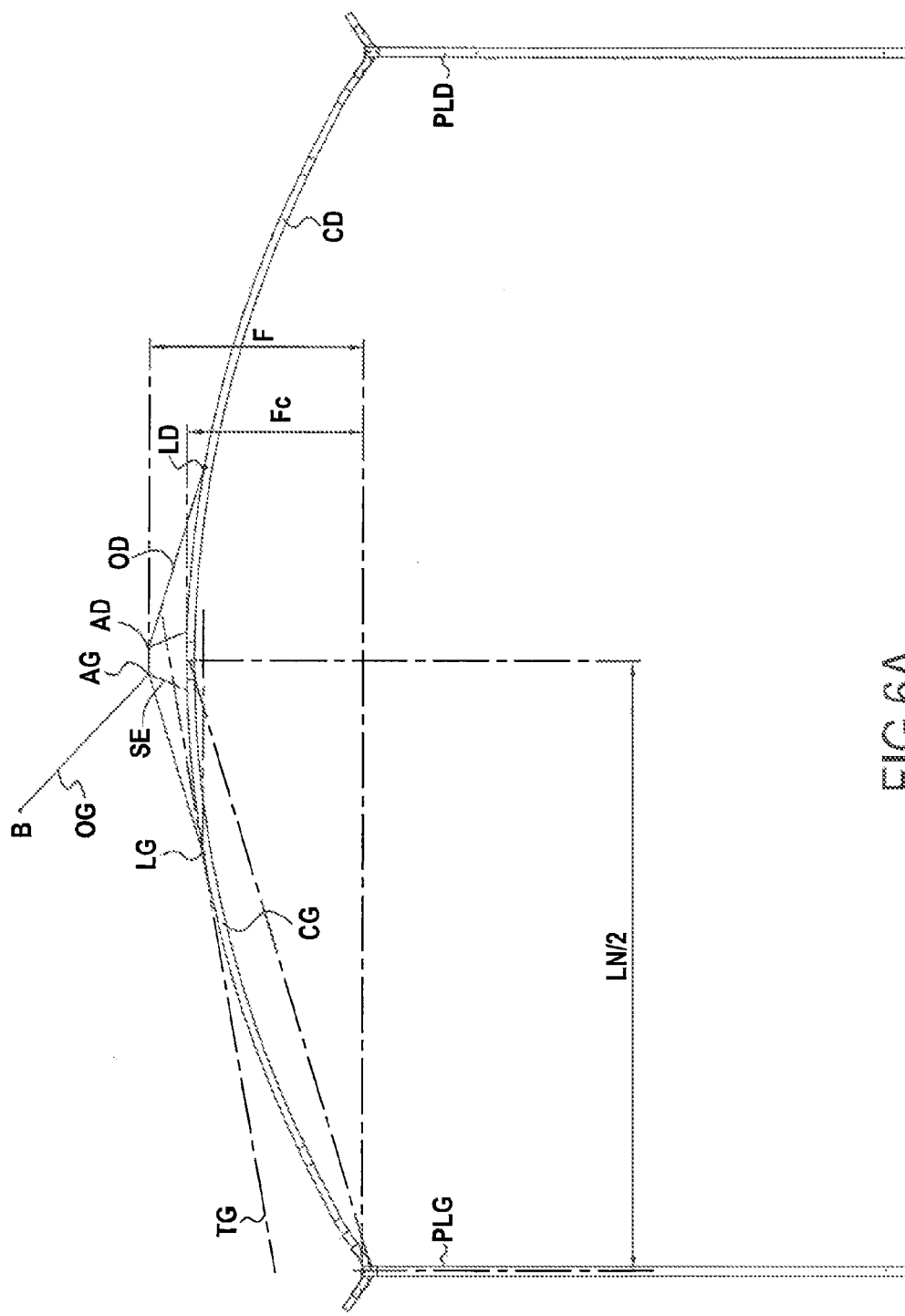
FIGS. 6A and 6B show a preferred embodiment of the invention using an elevation support.
Figure 6B:
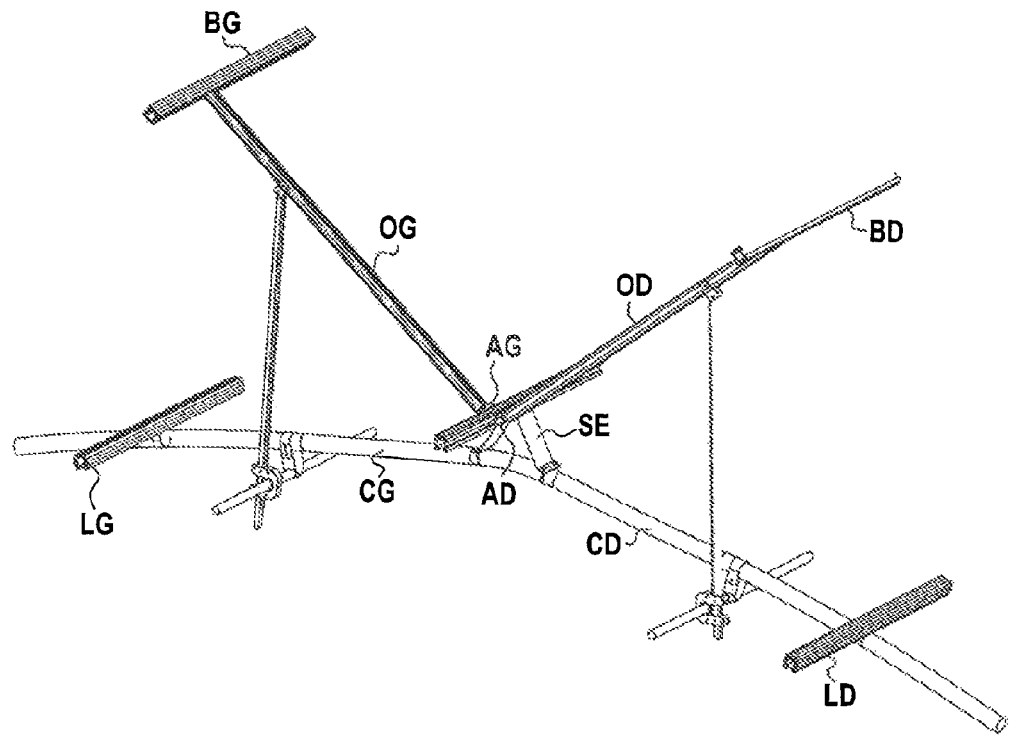

FIGS. 6A and 6B show a preferred embodiment of the invention. In these figures that are respectively a view of the profile of the greenhouse and a fragmentary perspective view of the structures in which the invention is to be found, two arcuate segments or "arcs" CG an CD are shown, each of which is mounted on a side post PLG and PLD. In this example, the vault height F is equal to 1.68 meters and the bay width LN is equal to 9.60 meters Thus, the characteristic dimensional ratio is equal to 0.175.

This value procures major flattening of the arch of the greenhouse, thereby making it possible to reduce the shadows cast on the successive greenhouses in very satisfactory manner.

Left and right side opening windows OG and OD mounted at the top of the greenhouse have a width of 1.50 m. The slope that each closed opening window forms with the horizontal is 17°. The end B of each opening window OG and OD comes to rest on a side lintel, respectively a left side lintel LG and a right side lintel LD, when the opening window OG, or respectively OD, is closed.

The slopes of each opening window OG and OD come to break slope with the tangents TG and TD taken at the lintels LG and LD. For example, it can be noted that the tangent TG at the point LG forms an angle of 10° with the horizontal, the opening window OG coming to form an angle of 7° with said tangent TG.

In this example, the break in slope is procured by the presence of an elevation support SE having a height of 30 cm and placed at the ridge where the arcuate segments CG and CD meet. This support carries the hinges forming the hinge axes AG and AD of the opening windows OG and OD.

In this example, the arcuate segments CG and CD are such that the ratio of the ridge height of the arcuate segment over the bay width LN is equal to 0.144.

Such a value for this ratio procures a very large amount of flattening of the overall vault and makes it possible to reduce the cast shadows drastically. This advantage is further reinforced whenever the sun's rays are tracked by progressively opening the aligned opening windows in a manner angled relative to the sun as shown diagrammatically in FIG. 5.

The very pronounced flattening of the vault formed by the arcuate segments allows the sun's rays to pass through under the aligned opening windows. The duration of sunshine then obtained is comparable to the duration of sunshine obtained with a greenhouse having a characteristic dimensional ratio equal to the ratio of the ridge height Fc over the bay width LN even though, in reality, the greenhouse reaches a high point that is higher by means of the break in slope.

In addition, it is noted that the maximum "aligned" slope of the opening windows is equal to the angle of closure of the opening windows which is at least a minimum of 15° and, in the greenhouse shown in FIG. 6, 17°. With the invention, since the greenhouse is highly flattened, this angle of solar incidence of 17° corresponds to cast shadows that extend over very small areas. With the invention, the duration of occurrence of cast shadows is minimized.

At sunrise, the opening windows are advantageously aligned horizontally. Then, they are inclined as the sun goes higher, while tracking the angle of solar incidence. Once the angle of closure of one of the opening windows has been reached, the angle of solar incidence is then close to the angle for which the cast shadows disappear. It is thus possible to guarantee that, once the maximum slope of the plane of the opening windows has been reached by tracking the angle of solar incidence, the flattened profile of the greenhouse takes over so as to procure a duration of sunshine that is improved compared to the duration of sunshine procured with a conventional pointed arch.

It can thus be observed that, with the greenhouse of FIG. 6, when the opening window is closed, the cast shadows are small for angles greater than 20° and, with a method of tracking the angle of solar incidence on the greenhouse, as shown in FIG. 5, it is possible to track the low angle of solar incidence over the range 0° to 17°, which is the maximum angle of inclination of the plane formed by the two opening windows as aligned. It can be seen in this example that the duration of sunshine is thus optimized.

This is entirely advantageous compared with what is known today. The invention thus makes it possible to gain duration of sunshine and thus to improve productivity in greenhouses implemented in accordance with the invention.

The greenhouse shown in FIG. 6A further has a side post height greater than 3.5 m. Such a height procures an effective chimney effect in combination with the presence of the central double opening windows despite the flattening of the profile of the greenhouse.

It should be noted that other means for raising the hinge axes A of the opening windows may be used. In particular, it is possible to use an arcuate segment that itself has a break in slope for installing the double opening window of the invention and thus, for solving the problem of condensation.

Figure 7:
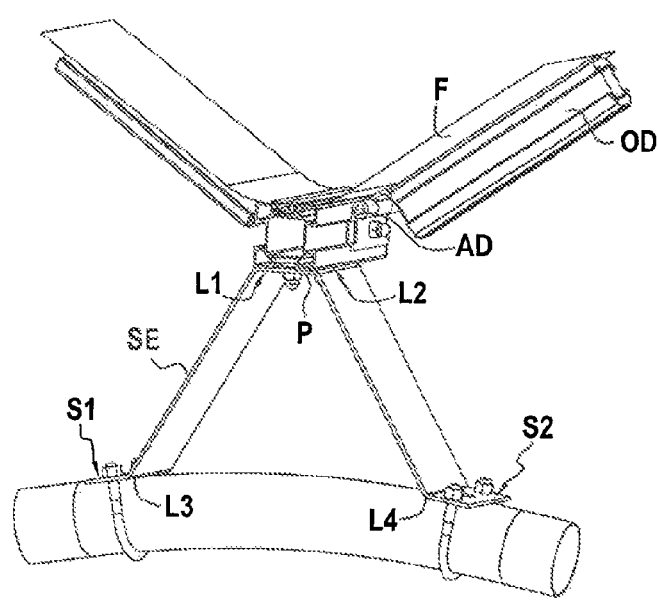
FIG. 7 shows the elevation support in detail.

FIG. 7 shows an example of an advantageous elevation support SE of the invention. Said elevation support SE is made of a longitudinal sheet of metal, folded along at least two lines L1 and L2 to obtain a top flange-plate, referenced P, on which it is possible to install any element making it possible to mount the hinges forming the hinge axes of the side opening windows.

The mechanical properties of the metal sheet folded in this way procure excellent rigidity suitable for withstanding the stresses to which the greenhouse might be subjected at the opening windows.

Advantageously, the sheet is folded along two additional edges L3 and L4, in such a manner as to obtain two base flange-plates S1 and S2 that are suitable for fastening to the roof-forming arch segments CG and CD. In this example, fastening is achieved at a central sleeve interconnecting the arch segments CG and CD.

Mounting the elevation support SE is particularly easy. In addition, the flange-plate P of the elevation support SE may be used to place a purlin of the aluminum clip type such as already protected by Filclair. The shaped section member constituting the purlin, having four identical rails, offers a wide variety of fastening functions that are entirely appropriate for fastening the hinge axes of the opening windows or indeed the film F covering the opening windows, etc.

Insofar as a single film is tensioned between two opening window arms by a single clip on the extruded purlin, the top central clip fully provides the sealing at the hinge. The presence of the top rail thus procures very good protection against rain.

Advantageously, between each hinge constituting the hinge axis of each of the opening windows, the aluminum clip is advantageously provided with a PVC section member for collecting drips of condensation during the opening operation.

It should be noted that the distance between the hinges constituting the hinge axes of the opening windows may be variable and adjustable as is the fastening to the elevation support.

Finally, it should be noted that various embodiments may be made on the principles of the invention.

The invention claimed is:

1. A span type greenhouse designed to be installed in multi-span runs each covering several thousand square meters uninterrupted, said span type greenhouse comprising a plurality of structural units installed parallel to one another over the entire length of a bay defined under the span;
    each structural unit including two side vertical posts having a height greater than or equal to 3.5 m, separated by a bay width greater than 9 m and supporting roof-forming arch segments at their top ends, the arch segments meeting at a center of the greenhouse, the structural units being connected together at the top ends of the posts via longitudinal gutters;
    the surfaces of the greenhouse being adapted to receive a transparent roof covering made up of one or more plastic films;
    said greenhouse having a ratio of a distance between the top of the greenhouse and the horizontal straight line passing through the top ends of the side vertical posts over the bay width less than 1/5;
    said greenhouse having central double opening windows hinged along a hinge axis at the top of the greenhouse, the double opening windows being such that each side opening windows has a width between the hinge axis and the end of the opening window equal to 1.4 m, the end of the opening window coming to rest on side lintels on closure;
    the transverse profile of the greenhouse with its opening windows closed being such that, on either side of the greenhouse, the angle formed between the straight line that is tangential to the arch segment in the transverse plane of the greenhouse at the side lintel and the straight line intersecting the hinge axis and the end of the closed side opening window in the transverse plane of the greenhouse is non-zero in the direction of a concave side of the profile of the greenhouse, this break in slope procuring a slope for the closed opening window that is at least 15°.

2. The greenhouse according to claim 1, wherein the ratio of the distance between the top of the greenhouse and the horizontal straight line passing through the top ends of the side posts over the bay width is less than 0.182.

3. The greenhouse according to claim 1, wherein the break in slope is provided via an elevation support fastened to the top of the roof-forming arch segments and at the top of which the hinge axis of the side opening windows is placed.

4. The greenhouse according to claim 3, wherein the ratio of the distance between the point of junction at which the arch segments meet and the horizontal straight line passing through the top ends of the posts over the bay width is less than 0.17.

5. The greenhouse according to claim 4, wherein the ratio of the distance between the point of junction at which the arch segments meet and the horizontal straight line passing through the top ends of the posts over the bay width is less than 0.15.

6. The greenhouse according to claim 3, wherein the roof-forming arch segments are arcuate segments, the curvature of the roof-forming arch segments being broken or unbroken.

7. The greenhouse according to claim 3, wherein the elevation support is made of a metal sheet folded into a trapezoid shape.

8. A The greenhouse according to claim 1, wherein the greenhouse includes an automatic management module for automatically managing the opening windows, said module being suitable for controlling operation of the opening windows and is programmed to control opening of the opening windows as a function of the angle of solar incidence.

9. The greenhouse according to claim 8, wherein the angle of solar incidence is preprogrammed in the module as a function of the calendar day and of the time at the place where the greenhouse is installed.

10. The greenhouse according to claim 8, wherein the management module is connected to a sensor for sensing the angle of solar incidence, the management module for managing the opening windows receiving data giving measured angle of solar incidence and being programmed to control the opening of the opening windows as a function of said measured angle.

11. The greenhouse according to claim 1, wherein the direction of the concave side of the profile of the greenhouse is the elevation direction of the greenhouse.

* * * * *